United States Patent [19]

Grasso et al.

[11] Patent Number: 5,218,665
[45] Date of Patent: Jun. 8, 1993

[54] DOUBLE CORE, ACTIVE FIBER OPTICAL AMPLIFIER HAVING A WIDE BAND SIGNAL WAVELENGTH

[75] Inventors: Giorgio Grasso, Monza, Italy; Paul L. Scrivener, Southampton, United Kingdom

[73] Assignee: Pirelli Cavi S.p.A., Milan, Italy

[21] Appl. No.: 954,468

[22] Filed: Sep. 30, 1992

Related U.S. Application Data

[63] Continuation of Ser. No. 651,472, Feb. 6, 1991, abandoned, which is a continuation-in-part of Ser. No. 553,246, Jul. 13, 1990, Pat. No. 5,087,108.

[30] Foreign Application Priority Data

Feb. 7, 1990 [IT] Italy .................. 19280 A/90

[51] Int. Cl.$^5$ .............................................. G02B 6/26
[52] U.S. Cl. .................................. 385/142; 385/126; 385/30; 372/6; 359/341
[58] Field of Search ............... 350/96.15, 96.16, 96.29, 350/96.33; 372/6; 385/24, 50, 123, 126, 141, 142

[56] References Cited

U.S. PATENT DOCUMENTS 4,546,476 10/1985 Shaw et al. ..................... 372/6
4,742,307 5/1988 Thylen .
4,883,335 11/1989 Alferness et al. ............. 350/96.15

OTHER PUBLICATIONS

Grasso et al.; Ofc'91 Tech Digest, p. 195; Feb. 1991.
Journal of the Optical Society of America, A/vol. 2, No. 1, Jan. 1985, pp. 84-89.

Primary Examiner—John D. Lee
Assistant Examiner—John Ngo
Attorney, Agent, or Firm—Brooks Haidt Haffner & Delahunty

[57] ABSTRACT

An optical amplifier for telecommunication lines over which communication signals at a predetermined wavelength are transmitted. The amplifier has portions of two optically coupled fibers, at least one of the fibers being an active fiber, interconnected by a length of active fiber connected to the one fiber of successive portions. Preferably, the active fibers are doped with erbium, and the coupling wavelength of the two fibers is different from the communication signal wavelength so that energy of the spontaneous emission of erbium is transferred from the one fiber to the other fiber and absorbed in the latter permitting amplification of communication signals in a range of wavelengths corresponding to the tolerance range of commercial laser signal emitters.

39 Claims, 2 Drawing Sheets

DOUBLE CORE, ACTIVE FIBER OPTICAL AMPLIFIER HAVING A WIDE BAND SIGNAL WAVELENGTH

RELATED APPLICATIONS

This application is a continuation of application Ser. No. 07/651,472, filed Feb. 6, 1991 now abandoned, which is a continuation-in-part of application Ser. No. 07/553,246 filed Jul. 13, 1990, now U.S. Pat. No. 5,087,108, and entitled A Double Active Fiber Optical Amplifier Having a Wide-Band Signal Wavelength, the disclosure of which is incorporated herein by reference and includes features set forth in application Ser. No. 07/642,221 filed Jan. 16, 1991 and entitled "Optical Amplifier with Bent, Single-Mode Active Fiber".

FIELD OF THE INVENTION

The present invention relates to an optical fiber containing laser emission dopant substances and suitable for amplification of a transmission signal transiting it and for eliminating radiations having an undesired wavelength produced in the fiber by spontaneous emission.

BACKGROUND OF THE INVENTION

It is known that optical fibers having the core doped with certain substances, e.g. the ions of rare earth, have characteristics of stimulated emission suitable for use as laser sources and as optical amplifiers.

In fact, such fibers can be supplied with a light energy at a specific wavelength which causes the atoms or ions of the dopant substance to reach an excited energy state, or pumping band, from which the atoms decay spontaneously in a very short time to a laser emission state where they remain for a relatively longer time.

When a fiber having a high number of atoms at the excited state in the emission level is transited by a light signal having a wavelength corresponding to such laser emission state, the signal causes the transition of the excited atoms to a lower level with an energy emission having the same wavelength as the signal. Thus, a fiber of this type can be used to obtain an amplification of an optical signal.

From the excited state, the atoms also decay spontaneously, and this generates an energy emission which constitutes a background noise signal which is superimposed on the stimulated emission corresponding to the amplified signal.

The light emission generated by the introduction into the doped, or active fiber of light pumping energy can occur at several wavelengths, typical of the dopant substance, thereby producing a fluorescence spectrum for the energy emitted by the fiber.

With the object of obtaining the maximum amplification of the signal by means of a fiber of the above type, in combination with a high signal/noise ratio, for optical telecommunications, the transmission signal normally used is generated by a laser emitter with a wavelength corresponding to a peak of the fluorescence spectrum curve of the fiber incorporating the dopant substance used.

In particular, for the amplification of optical telecommunication signals, it is convenient to use active fibers with a core doped with Erbium ions ($Er^{3+}$). However, Erbium's fluorescent spectrum, in the range of the wavelengths of interest, has an especially narrow emission peak, and therefore, this imposes the use as the source of the transmission signal of a laser emitter operating at a specific wavelength with a limited tolerance because signals outside such range of tolerance would not be adequately amplified and a strong spontaneous emission signal would occur at such a peak wavelength which constitutes a background noise which would greatly impair the quality of On the other hand, laser emitters having the above characteristics, that is, operating at Erbium's omission peak, are difficult and costly to manufacture. The usual industrial production provides laser emitters, e.g., semiconductor lasers (In, Ga, As), having several characteristics which make them suitable for use in telecommunications, but have a fairly wide tolerance as to the emission wavelength. Thus, only a limited number of laser emitters commercially produced has the emission at the desired peak wavelength of the dopant.

While, for some applications, such as submarine telecommunication lines, it can be acceptable to use transmission signal emitters operating at a specific wavelength and obtained, by making a careful selection among commercial production lasers so that only those which have the emission within a small range of the laser emission peak of the amplifier fiber, such a process is not financially acceptable for lines of other kinds, such as, urban communication lines, where the containment of installation costs is of special importance.

For example, a fiber doped with Erbium, for providing laser emission, has an emission with a peak around 1536 nm. For a range of about 5 nm from this value, the emission has a high intensity and may be used for the amplification of a signal in the same wavelength range. However, commercially produced semiconductor lasers which may be used for transmission usually have emission wavelength values ranging from 1520 to 1570 nm.

Accordingly, a considerable number of commercially produced lasers of this kind have emission wavelengths outside the range suitable for amplification with Erbium and, therefore, cannot be used for generating telecommunication signals in lines equipped with Erbium amplifiers of the type described hereinbefore.

However, it is known that fibers doped with Erbium have a range of the emission spectrum of high intensity, although lower than the peak, which is substantially constant in the wavelength range contiguous to the above-mentioned peak and is sufficiently wide to include a large part of the emission range of the commercial lasers of interest. In a fiber of this type, a signal provided at a wavelength displaced from the maximum emission peak would be amplified to a limited extent whereas the spontaneous transitions from the laser emission state in the fiber provide emission prevalently at the peak wavelength of the spectrum, at 1536 nm, thereby generating a background noise which will be amplified as it progresses along the length of the fiber, superimposing itself on the useful signal.

In order to use active fibers doped with Erbium for the amplification of telecommunications signal generated by semiconductor laser emitters of a commercial type, the need arises for filtering Erbium's spontaneous peak emission, in the length of the active fiber, so that such emission at an undesired wavelength shall not take pumping energy away from the amplification of the signal and shall not be superimposed on the transmission signal.

For this purpose, an active fiber having two cores can be used in one of which the transmission signal and the pumping energy are present while in the other, there is a light absorbing dopant. If the two cores are optically coupled at the peak wavelength of the spontaneous emission, energy of the spontaneous emission will be transferred to the second core where it is absorbed without returning to one core carrying the transmission signal.

Such an active fiber, described in said U.S. patent application Ser. No. 07/553,246 (U.S. Pat. No. 5,087,108) provides an effective filtering action of the undesired wavelength but in some applications, where the fiber is subjected to mechanical or thermal stresses, and in particular, to twisting, the optical coupling characteristics between the cores can be altered, and the value of the wavelength of the energy transferred to the second absorbing core is modified.

Thus, the problem arises of having available an active optical fiber for use in optical amplifiers which can be used in combination with laser emitters of the transmission signal of a commercial type, without imposing significant qualitative limitations and which is substantially insensitive to deformation stresses and conditions imposed upon it during the construction of the amplifier or occurring during the laying and operational stages of the amplifier in the line.

SUMMARY OF THE INVENTION

One object of the present invention is to provide a doped optical fiber amplifier which can offer a satisfactory amplification in a sufficiently extended range of wavelengths, so as to allow the use of commercial laser emitters while eliminating the spontaneous emissions of the dopant at an undesired wavelength, which latter constitute background noise of a high intensity with respect to the transmission signal, and while stably maintaining such characteristics during operational conditions.

In accordance with the present invention, a wide signal band optical amplifier, particularly for optical fiber telecommunication lines operating with the transmission signal in a predetermined wavelength band, comprises a dichroic coupler, suitable for multiplexing a transmission signal and light pumping energy in a single outgoing fiber, and an active optical fiber containing a fluorescent dopant substance connected to the output fiber of the dichroic coupler and to a telecommunications line fiber suitable for receiving and transmitting an amplified signal. The active optical fiber comprises portions each constituted by an optical fiber having two cores, one of which is optically connected to the core of the remaining portions of active fiber while the other core is interrupted at the extremities. The two cores are optically coupled together in a wavelength band which is included in the wavelength range of the laser emission of the one core and which is different from the transmission signal band.

In a preferred embodiment, the second or other core of the portions of two-core fiber of the active optical fiber contains a dopant having a high light energy absorption in the laser emission range of the active fiber's dopant. Conveniently, the dopant having a high light energy absorption of the second core can be the same as fluorescent dopant substance present in the active fiber.

The one core of double-core fiber portion can contain a fluorescent dopant, or, as an alternative, such core of each double-core fiber portion can be without any fluorescent dopant.

Conveniently, the fluorescent dopant substance present in the active fiber, at least inside its portions having a single core, is Erbium.

According to another embodiment, the dopant substance present in the second core can a substance having a high light energy absorption over the entire spectrum selected from Titanium, Vanadium, Chromium or Iron, present, at least in part, in their lower valency state.

The length of each section of two-core fiber is equal to or greater than the beat length between the cores coupled in the selected coupling band between the cores.

The content of dopant having a high light energy absorption of the second core and the coupling characteristics of the fiber cores are correlated so as to provide in the second core a quenching length less than 1/10th of the beat length between the coupled cores.

In a particular embodiment of the invention, the second core is without any light absorbing dopant and each portion of two-core fiber has a length equal to a whole multiple of one beat length with a tolerance of 10% of the beat length.

In the case where the fluorescent dopant of the active fiber is Erbium, the two cores of the portions of double-core fiber are optically coupled together between 1530 and 1540 nm.

The first or said one core of each portion of double-core fiber is arranged coaxially with the fiber's external surface, in alignment with the cores of the remaining portions of active fiber and with the cores of the fibers to which the amplifier is connected, while the second core, at its extremities, faces the cladding of the adjoining fibers.

At least the first of the two cores of the fiber is suitable for permitting monomodal light propagation at the transmission wavelength and at the pumping wavelength.

The fiber section of the active fiber which contains fluorescent dopant and which is included between two consecutive double-core portions, or at the first of such portions, has a length not greater than that corresponding to a maximum obtainable gain of 15 dB at the coupling wavelength between the cores of the portions of double-core fiber and preferably, is between 1 and 5 dB.

At least one extremity of the active fiber is constituted by a section of double-core fiber.

The portions of double-core fiber are mechanically curvable in an arc for the fine adjustment of the coupling wavelength band between the cores.

Conveniently, each portion of double-core fiber is rigidly constrained to a respective support plate, substantially undeformable under operational conditions.

In addition, each portion of double-core fiber is rigidly constrained to the respective support plate in the curvature conditions corresponding to the desired coupling wavelength band between the cores.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF PREFERRED EMBODIMENTS

Figure 1:
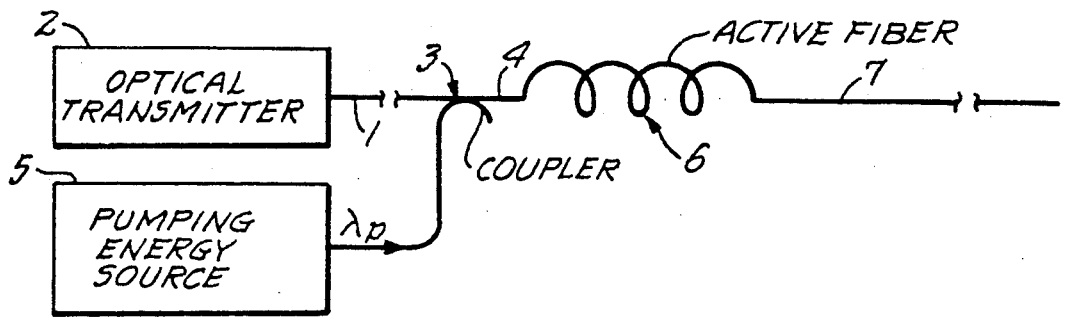
FIG. 1 is a schematic diagram of an optical amplifier using an active fiber.

For the purpose of amplifying a signal in optical fibers for telecommunications, amplifiers making use of active optical fibers may conveniently be used. The structure of such amplifiers is illustrated schematically in FIG. 1 where the numeral 1 designates an optical fiber for telecommunications along which there is sent a transmission signal having a wavelength $\lambda_s$ and generated by transmitter 2 comprising a laser signal emitter 2. Such a signal, attenuated after transiting a certain length of line, is applied to a dichroic coupler 3 where it is combined on a single outgoing fiber 4 with a pumping signal having a wavelength $\lambda_p$ and generated by a pumping laser emitter 5. An active fiber designated as a whole with the numeral 6 is connected to a fiber 4 at the coupler output and constitutes the amplifying element for the signal. The signal is then introduced into the line fiber 7 for continuing to its destination.

According to a preferred embodiment of the invention, the active fiber 6, constituting the unit's amplifying element can be an optical fiber made of silicon whose core is doped in solution, in a known manner, with $Er_2O_3$ which allows an advantageous amplification of the transmission signal by exploiting Erbium's laser transitions.

Figure 2:
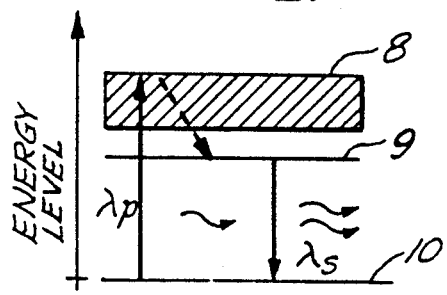
FIG. 2 is a diagram of the energy states of erbium ions in a fiber of the type which can be used for the amplifier of FIG. 1 and which is suitable for generating a stimulated laser emission.

FIG. 2 symbolically represents the energy states available for an Erbium ion in solution in the fiber's siliceous matrix. The introduction into the active fiber of a light power or energy having a pumping wavelength $\lambda_p$, lower than the wavelength $\lambda_s$ of the transmission signal, causes a certain number of $Er^{3+}$ ions present as a dopant substance in the fiber to reach an excited energy state 8, hereinafter defined as the "pumping band", from which the ions decay spontaneously to an energy level 9 constituting a laser emission level.

In the laser emission level 9, the $Er^{3+}$ ions can remain for a comparatively long time before being subjected to a spontaneous transition to the base level 10.

As is known, while the transition from band 8 to level 9 is associated with an emission of a thermal type, which is dispersed outside the fiber (phononic radiation), the transition from level 9 to the base level 10 generates a light emission with a wavelength corresponding to the energy value of the laser emission level 9. If a fiber containing a high quantity of ions at the laser emission level is traversed by a signal having a wavelength corresponding to such emission level, the signal causes the stimulated transition of the ions from the level 9 to the base state 10, before spontaneous decay thereof, with a cascade effect which, at the ouput of the active fiber 6, causes the emission of a strongly amplified transmission signal.

Figure 3:
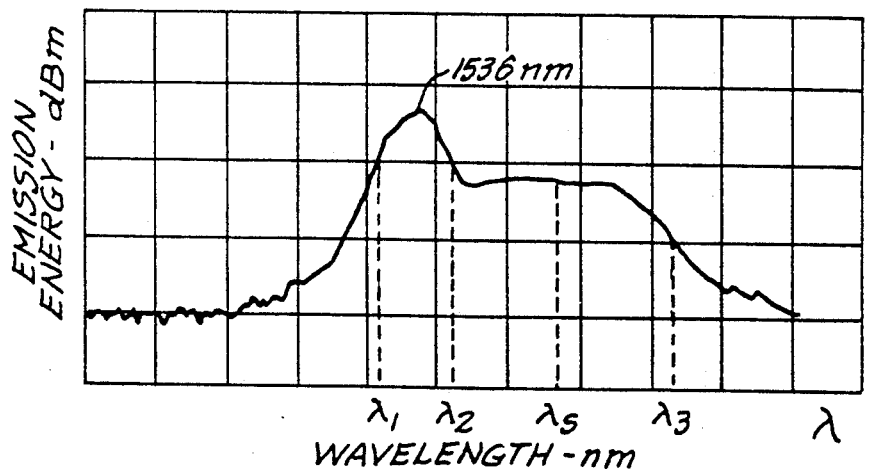
FIG. 3 is a graph of the stimulated emission curve of an optical fiber made of silicon and doped with $Er^{3+}$.

In the absence of a transmission signal, the spontaneous decay of the ions from the level 9, which are in a discrete number which is typical for each substance, generates light energy with peaks at various frequencies corresponding to the available levels. In particular, as illustrated in FIG. 3, a fiber of the Si/Al or Si/Ge type which is doped with $Er^{3+}$ and which is suitable for use in optical amplifiers, has a high intensity emission peak at a wavelength of 1536 nm, while at greater wavelengths, up to about 1560 nm, there is an area in which the emission still has a high intensity but lower than that of the peak area.

In the presence of a light signal introduced into the fiber at the wavelength corresponding to the emission peak of $Er^{3+}$, i.e. 1536 nm, there is a very strong amplification of the signal, whereas the background noise, due to the spontaneous emission of Erbium, remains limited. Accordingly, the fiber is suitable for use in an optical amplifier for a signal at such a wavelength.

For the generation of the telecommunication signal, lasers of the semiconductor type (In, Ga, As) are commercially available and are convenient to use. Such lasers have a typical emission band from 1.52 to 1.57 $\mu$m and this means that the technique used to produce them is such that, for all the pieces manufactured, the emission of the transmission signal at a particular frequency value, corresponding to the emission peak of the fiber doped with Erbium used as an amplifier cannot be guaranteed. On the contrary, a large percentage of pieces provide a signal wavelength in the sections of the fiber's emission curve adjacent to the emission energy peak.

If the signal generated by such laser emitters is not at the emission energy peak, the signal would not be amplified with sufficient gain in an optical amplifier doped with $Er^{3+}$ and of the type described above since the pumping power introduced into the active fiber would, for the most part, be used to amplify the background noise which is generated inside the active fiber itself with the spontaneous emission of Erbium at a wavelength of about 1536 nm.

Figure 4:
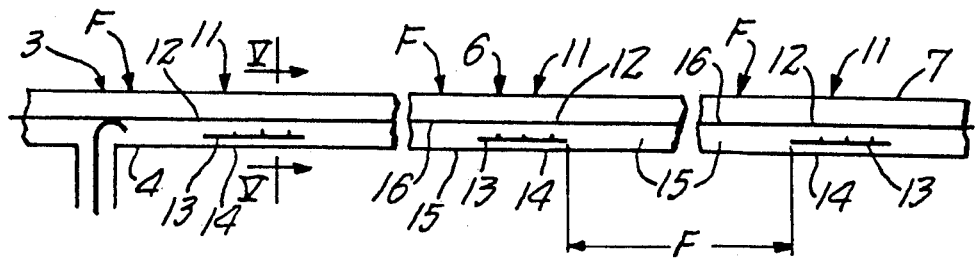
FIG. 4 is an enlarged schematic, and fragmentary view of an optical amplifier according to the invention.

Therefore, in order to use laser emitters of the above type while permitting a range of production tolerance which is sufficiently wide to make their use inexpensive in amplifiers using fibers doped with Erbium, that is, in general, to allow the use of such types of laser signal emitters in combination with fluorescent dopants having a high background noise due to spontaneous transitions from the laser state, the invention provides for use of an active fiber 6 as illustrated in FIG. 4. The fiber 6 comprises portions 11 of fiber having two cores, 12 and 13, respectively, which are enclosed within the same external cladding 14 and are alternated with portions 15 of single-core fiber.

The core 12 of each portion of double-core fiber 11 is connected to the core 16 of the contiguous portions of single-core fiber 15 and, at the extremities of the active fiber, is connected to the fiber 4 leaving the dichroic coupler and to the line fiber 7, respectively. Thus, the core 12 conducts the transmission signal. The core 13, or secondary core, is interrupted at the two extremities of each portion of two-core fiber 11 and has no further connections.

Figure 6:
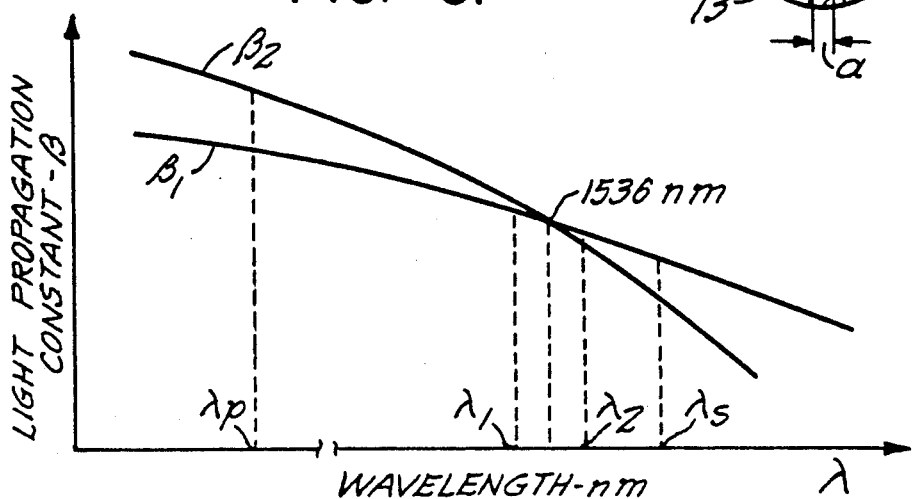
FIG. 6 is a graph of the light propagation constants within the cores of the active fiber according to the invention in relation to the wavelength.

The curves of the variation of the light propagation constants $\beta_1$ and $\beta_2$ within the fiber are shown in FIG. 6. The two cores 12 and 13 of the portions of fiber 11 are made so that the respective light propagation constants $\beta_1$ and $\beta_2$ within the fiber are such as to accomplish the optical coupling between the two cores 12 and 13 at the wavelength of the maximum emission energy peak of the fluorescent dopant, specifically, at 1536 nm for Erbium, and in a range between $\lambda_1$ and $\lambda_2$, the amplitude of which range is determined by the slope of curves $\lambda_1$ and $\lambda_2$ in their area of intersection and corresponds, substantially as indicated in FIG. 3, to the amplitude of the emission energy peak itself, generating background noise.

The preferred coupling range between the two cores 12 and 13, in the case where Erbium is used as the fluorescent dopant of core 16, can be from $\lambda_1 = 1530$ to $\lambda_2 = 1540$ nm.

This means that light having a wavelength of about 1536 nm, which is propagated in core 12 together with the transmission signal and which substantially constitutes background noise due to the spontaneous emission of Erbium, is periodically transferred from core 12 to core 13, according to the known laws of optical coupling, described, for example, at pages 84 and 90 of the Journal of The Optical Society of America, A/Vol. 2, No. 1, Jan. 1, 1985.

Figure 7:
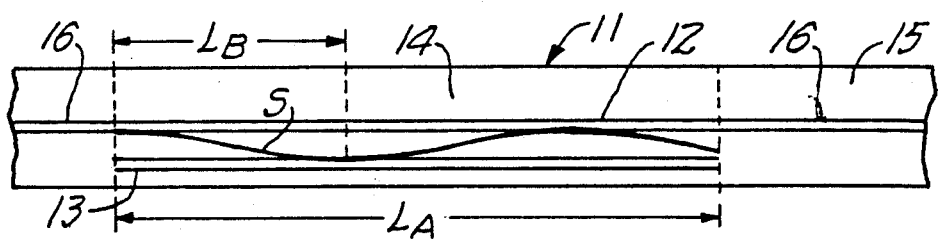
FIG. 7 is a schematic illustration of a portion of an active optical fiber according to the invention which comprises a section having a double core.

As represented in FIG. 7, the light power at the optical coupling wavelength between the two cores, the core 13 having the length $L_A$, is distributed between the cores according to a substantially sinusoidal curve S reaching 100% in one of the cores at one point of the fiber and after a distance $L_B$, known as the beat length, reaching 100% in the other of the cores, while in intermediate sections of the fiber, the light power is distributed between the two cores.

The transmission signal in core 12, on the other hand, has a wavelength $\lambda_s$ different from that at which coupling occurs between the two cores 12 and 13, for example, equal to 1550 nm, and therefore, the transmission signal remains confined in core 12 without transferring to core 13. In the same way, the pumping light supplied to the core 16 by the coupler 3, e.g., at a wavelength $\lambda_p$ of 980 or 540 nm, has propagation constants whereby, within the section of the fiber 11, its passage to the core 13 is excluded thereby assuring the absence of pumping energy in the core 13.

Preferably, core 13 contains a dopant, in addition to the dopant which determines its desired refraction index profile, which is constituted by a material having a high light absorption over the entire spectrum, or at least at the emission peak of the dopant of core 16 which is a source of noise as previously described, in particular, at the peak of about 1536 nm in the case of the use of Erbium as the laser dopant.

Substances suitable for the purpose, having a high light absorption over the entire spectrum are, for example, described in U.S. Pat. No. 4,881,793 and, in general, comprise variable valency elements, such as Ti, V, Cr, Fe, in their lower valency state ($Ti^{III}$, $V^{III}$, $Fe^{II}$).

Among the substances with a high light absorption at a particular wavelength, that is, at the wavelength of the emission peak of the dopant of the core 16 of the amplifying fiber portion 15, which it is required to eliminate, it is especially convenient to use the same dopant as used in the active core. In fact, a fluorescent substance provided with a sufficient quantity of pumping energy exhibits a certain emission at a particular wavelength, while the same substance, when it is not provided with pumping energy, absorbs light at the same wavelength at which emission occurs in the presence of pumping.

In particular, with a core 16 doped with Erbium, the second core 13 can also be doped with Erbium.

In this way, since the Erbium absorption curve is similar to its fluorescence or laser emission curve, illustrated in FIG. 3, there is at the stimulated emission peak of 1536 nm, a similar absorption peak at the same wavelength.

Accordingly, the fluorescence energy at the coupling wavelength between the cores, that is, at 1536 nm, which has been transferred to core 13, is not transferred back to core 12, within which the transmission signal at a different wavelength is guided because inside core 13 there can be a substantially complete attenuation of the light energy which is introduced and which is absorbed by the dopant present.

The emission at the undesired wavelength present in the core 16 can thus be introduced into the fiber portion 11 before it becomes of excessive intensity and, within such portion 11, the energy at the undesired wavelength can be extracted from core 12 and dispersed within core 13 so as not to withdraw pumping energy used for the amplification of the transmission signal which is introduced by the core 12 into the core 16 of the subsequent portion of amplifying fiber 15 and which is superimposed on the transmission signal.

For this purpose, according to the invention, it is necessary for the section F of the amplifying fiber portion 15, preceding a section of double-core fiber 11, as illustrated in FIG. 4, to be of limited length to avoid an excessive increase in background noise. Such length depends on the characteristics of the fiber itself, and in short, on its gain. The amplifier according to the invention provides for the length F to be such as to determine a maximum gain of less than 15 dB, and preferably ranging from 1 to 5 dB, at the coupling wavelength between the cores, and in particular, at 1536 nm.

Core 12 of fiber portion 11 can be without any fluorescent dopant, so that the entire amplification gain is obtained with the portions 15 of the fiber, or it can contain the same dopant as the core 16.

The length $L_A$ of the section of two-core fiber is greater than the length $L_B$, mentioned hereinbefore. In addition, the content of dopant having a high light absorption is such as to determine a quenching length $L_A$ of core 13 of the fiber which is less by at least one order of magnitude than the beat wavelength $L_B$, i.e., $L_A < 1/10 \, L_B$ as is known from the law of propagation of optical power in an attenuating medium which is defined as $P = P_0 e^{-aL}$ where a is a coefficient which depends on the fiber's attenuation characteristics and substantially on the quantity of attenuating dopant present in it and where after a length L of fiber the light energy in the fiber is reduced by a factor $1/e$. Preferably, the characteristics of core 13 are such as to have a quenching length $L_A$ less by two orders of magnitude than the beat wavelength $L_B$.

Figure 8:
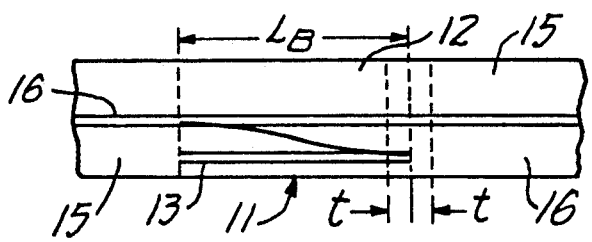
FIG. 8 is a schematic illustration of a portion of optical fiber according to the invention which comprises a section of double-core fiber having a length equal to one beat length.

The core 13 can also be without any attenuating dopant. In such case, as represented in FIG. 8, the section of two-core fiber 11 must have a length $L_A = L_B$, so that at the end of the second core 13, the light power at the wavelength to be eliminated is completely transferred within core 13 itself, that is, so that at the junction with fiber portion 15, the light power at the wavelength to be eliminated is dispersed in the cladding of fiber portion 15 itself.

Such a structure is convenient, as it is possible to avoid the introduction of additional dopants into the fiber 13 in addition to those which determine its refraction index profile, but, on the other hand, it requires, in the cutting of the fiber 13 to the required length and in the connection of the portion 11 to the remaining active fiber, a plus or minus tolerance with respect to the value of the beat wavelength $L_B$ not greater than 10% of $L_B$ so as to ensure, at the junction itself, the substantial absence of the noise wavelength in core 12.

If such tolerance is impractical, with beat lengths $L_B$ of less than a few centimeters, it is preferable to use attenuating substances in core 13 as described hereinbefore.

The determination of the size of the portions of fiber 11 is accomplished so that the propagation constants in the two cores provide a coupling in the band centered around the wavelength of peak emission, e.g., 1536 nm, but inevitable manufacturing tolerances can lead to departures from the desired value.

Figure 9:
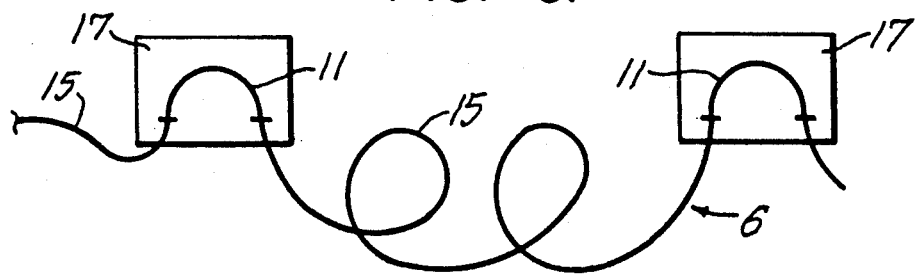
FIG. 9 is a portion of fiber of an amplifier according to the invention with double-core sections with a constrained curvature.

To obtain then, a fine adjustment of the coupling wavelength according to the invention, the portions 11 of the double-core fiber can be curved in an arc, thereby inducing internal tensions within the fiber which vary its light propagation characteristics and measuring the value of the coupling wavelength as the imposed curvature varies until the value of the desired wavelength is reached. Such configuration of the portions 11 of fiber are then constrained to respective support plates 17, as illustrated in FIG. 9, such as by means of an adhesive, so as to maintain their shape in a stable manner.

The single-core fiber portions 15 included between the portions 11 of double-core fiber may be arranged according to requirements within the enclosure of the amplifier, such as by winding it up into turns, without this having any effect on the behavior of the amplifier from the point of view of the separation of the wavelength constituting the noise. The double-core fibers are rigidly constrained in the curvature selected for them, as described above, and are protected against further stresses.

Conveniently, with the purpose of sending on to the subsequent section of the line 7 downstream from the amplifier a transmission signal with little noise, the last section of the amplifier's active fiber 6, in the direction of transmission of the transmission signal, is constituted by a double-core fiber 11. For lines to be used in a two-directional manner, both of the extremities of the active fiber are constituted by sections of double-core fiber 11.

Thus, the fiber according to the invention executes a filtering action of the light guided within the fiber itself, separating and absorbing the photons at 1536 nm which are generated by spontaneous decay from the laser emission level of $Er_{3+}$ ions, thereby preventing such photons from proceeding for a long section in the active core in the presence of pumping energy and from causing further decays at such wavelength. The fiber of the amplifier substantially allows the propagation in core 12 only of the transmission wavelength and of the pumping wavelength. The transmission wavelength $\lambda_s$ can then be selected over the entire range wherein Erbium has a significant value of laser emission, e.g., between the values $\lambda_2$ and $\lambda_3$ indicated in FIG. 3, which can correspond to about 1540–1560 nm and allow wide freedom of selection of the laser emitter of the transmission signal, without differences in behavior, for the purposes of amplification.

Therefore, emitters of signals having various wavelengths, included in a sufficiently wide range to accept the majority of the commercially produced semiconductor lasers (In, Ga, As) can be used, and at the same time, the use of portions of double-core fiber having a reduced length allows an accurate adjustment of the coupling wavelength and allows them to be substantially insensitive to mechanical stresses.

Figure 5:
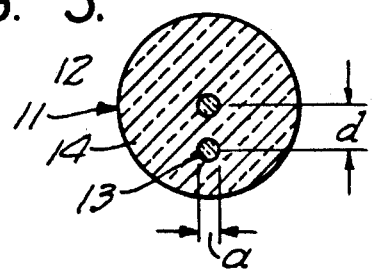
FIG. 5 is a cross-sectional view of the active fiber of the amplifier and is taken along the line V—V indicated in FIG. 4.

As shown by FIG. 5, preferably, the double-core fiber portion 11 has the core 12, used to guide the optical transmission signal, arranged coaxially inside the cladding 14 of the fiber whereas the second core 13 is arranged in an eccentric position.

In this way, as illustrated in FIGS. 4, 7, 8, the connection between the portions of double-core fiber 11, the portions of amplifying fiber 15 and the fibers 4 and 7 can be assembled in a traditional manner, without special procedures. The extremities of the fibers themselves are disposed so as to face one another through the traditional junction devices which accomplish the alignment between the fibers by checking their external surfaces to which the proper alignment of core 12 of the two-core fiber corresponds in an axial position with the cores of the single-core fibers without any substantial junction losses. The core 13, which is in an eccentric position, must not be connected to other cores and thus, remains interrupted at the extremities of each portion 11 of double-core fiber without requiring any further operations.

Preferably, so as to have the highest amplifying efficiency, the core 12 is monomodal both at the signal wavelength and at the pumping wavelength, and the core 13 also is monomodal at least at $\lambda_s$.

As an example, an amplifier has been built according to the schematic diagram of FIG. 1 with an active fiber 6 of the Si/Al type, doped with $Er^{3+}$ provided with double-core portions. The content by weight of $Er_2O_3$ in the single-core portions of the fiber was 40 ppm.

In each portion 11 of two-core fiber, the core 12 and the core 13 each had a radius a=3.1 $\mu$m, a numerical aperture NA=0.105 and a refraction index n1=1.462. The separation of the two cores 12 and 13, indicated in FIG. 5, was d=3.5 $\mu$m and the core 12 was coaxial with the external diameter of the fiber portion.

Each portion 11 had a length $L_A$=100 mm and was contiguous with a length F of amplifying fiber of 5 m.

Core 12 of each portion 11 of two-core fiber contained no Erbium, while core 13 had a content of $Er_2O_3$ of 2500 ppm.

The amplifying fiber had a total length of 30 m, and at the end of each single core portion, there was a double core portion of 100 mm length.

As the pumping laser 5 there was used an Argon ion laser, operating at 528 nm, with a power of 150 mw, while as the signal emitting laser 2, there was used a commercial-type semiconductor laser (In, Ga, As), having a power of 1 mw, whose emission wavelength was measured as 1550 nm.

Downstream from the amplifier, with the above experimental configuration, a gain of 20 dB was obtained, on an input signal attenuated to a value of 0.5 $\mu$W.

The attenuation of the amplifier input signal, suitable for simulating an actual condition of the amplifier's use in a line, has been obtained by means of a variable attenuator.

In the absence of a signal, a level of spontaneous emission has been measured, downstream from the amplifier, of 10 μW.

Such a spontaneous emission, which constitutes the background noise produced by the amplifier, does not represent significant noise for the signal, which is amplified to much higher levels (about 250 μW).

As a comparison, the same transmission laser emitter 2 described above has been used in combination with an amplifier having a structure identical with that of the previous example, but using only a single-core active fiber 6, of the step-index type Si/Al, doped with $Er^{3+}$, containing, by weight, 40 ppm of $Er^{3+}$ in the core. The active fiber had a length of 30 m.

Such an amplifier, with a transmission signal at a wavelength of 1560 nm, exhibited a gain of less than 15 dB with a spontaneous emission of a level comparable to that of the output signal.

As can be seen from the examples given, the single-core fiber amplifier provided a reduced gain in the presence of a signal at 1560 nm, while also introducing a noise signal which would make it difficult to receive the transmission signal itself and would provide to be unusable for a practical application. On the other hand, the amplifier according to the invention, using an active fiber provided with portions of double-core fiber, with the two cores coupled together at a wavelength corresponding to the emission peak of the background noise, can provide, with the same signal at 1560 nm, a high amplification gain, together with a negligible amount of introduced noise.

Accordingly, the use in a telecommunications line of amplifiers according to the invention allows such a line to be suitable for the transmission of signals generated by commercial types of laser emitters and permits a wide production tolerance for such emitters. At the same time, it is ensured that the amplification performance is substantially constant and independent of the actual emission wavelength value of the signal emitter used.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An active fiber optical amplifier for amplifying telecommunication signals at a predetermined wavelength, said amplifier comprising:
   at least one portion of two side-by-side optical fibers, at least one of said fibers containing a fluorescing dopant which has a peak emission at a wavelength different from said predetermined wavelength and having an input and an output and the other of said fibers being optically coupled to said one of said fibers at a coupling wavelength different from said predetermined wavelength, being open ended and having a length such that energy at the wavelength of said peak emission is absorbed therein;
   a source of pumping energy for pumping said one of said fibers and thereby raising the energy of the ions of said dopant; and
   an optical coupler coupled to said input of said one of said optical fibers and to said source and for coupling to a source of said telecommunication signals for providing both said telecommunication signals and said pumping energy to said input of said one of said optical fibers whereby energy at at least one wavelength different from said predetermined wavelength is absorbed and said telecommunication signals are amplified.

2. An active fiber optical amplifier as set forth in claim 1 wherein said optical coupler is a dichroic coupler having a coupler output and two coupler inputs and wherein said coupler output is coupled to said input of said one fiber, one of said coupler inputs is coupled to said pumping energy source and the other of said coupler inputs is adapted for connection to said source of telecommunication signals.

3. An active fiber optical amplifier as set forth in claim 1 wherein there are a plurality of the portions of said two optical fibers in series with a single one of said one of said fibers interconnecting the output of said one of said fibers of one of said portions with the input of said one of said fibers of the next adjacent portion.

4. An active fiber optical amplifier as set forth in claim 1 wherein said other of said fibers contains an absorbing dopant which absorbs energy at said wavelength different from said predetermined wavelength.

5. An active fiber optical amplifier as set forth in claim 4 wherein the content of said absorbing dopant and the coupling of said one fiber and said other fiber are selected so that said other fiber has a length less than one-tenth of the beating length between said one fiber and said other fiber at the coupling wavelength.

6. An active fiber optical amplifier as set forth in claim 4 wherein said absorbing dopant is the same as the first-mentioned said dopant.

7. An active fiber optical amplifier as set forth in claim 6 wherein both said absorbing dopant and said first-mentioned said dopant are erbium.

8. An active fiber optical amplifier as set forth in claim 4 wherein said absorbing dopant is selected from the group consisting of titanium, vanadium, chromium, iron and mixtures thereof, part of the selected absorbing dopant being present in its lower valency state.

9. An active fiber optical amplifier as set forth in claim 1 wherein the first-mentioned dopant is erbium.

10. An active fiber optical amplifier as set forth in claim 9 wherein said wavelength at which said one fiber is coupled to said other fiber is in the range from 1530 nm to 1540 nm.

11. An active fiber optical amplifier as set forth in claim 1 wherein the length of said one fiber and said length of said other fiber within a said portion is at least equal to the beating length between said one fiber and said other fiber at the coupling wavelength.

12. An active fiber optical amplifier as set forth in claim 11 wherein said other fiber is without an absorbing dopant and the lengths of said one fiber and said other fiber within a portion are within 10% of a whole multiple of a beating length between said one fiber and said other fiber.

13. An active fiber optical amplifier as set forth in claim 1 wherein said fiber and said other fiber are within a common cladding, said one fiber is co-axial with the external surface of said cladding and said other fiber is offset with respect to the axis of said cladding.

14. An active fiber optical amplifier as set forth in claim 1 wherein said at least one fiber is monomodal at said predetermined wavelength and at the wavelength of said pumping energy.

15. An active fiber optical amplifier as set forth in claim 1 wherein there are a plurality of the portions of said two optical fibers in series, the output of said one of said fibers of one portion being connected to the input of said one of said fibers of the next adjacent section by a length of said one fiber without said other of said fibers, the last-mentioned said length being selected to provide a gain of not more than 15 dB at said wavelength of coupling between the first-mentioned said one of said fibers and said other of said fibers.

16. An active fiber optical amplifier as set forth in claim 15 wherein one of said plurality of portions is at at least one end of said series of portions.

17. An active fiber optical amplifier as set forth in claim 1 wherein said portion is constrained in an arc to provide said coupling wavelength.

18. An active optical fiber amplifier as set forth in claim 1 wherein said source of pumping energy provides energy at a wavelength lower than said predetermined wavelength and said wavelength different from said predetermined wavelength and said optical coupler is coupled to said input of said one one of said fibers by a portion of optical fiber containing a fluorescent dopant which emits radiation in a wavelength range which includes said predetermined wavelength and said wavelength different from said predetermined wavelength.

19. An active fiber optical amplifier for amplifying telecommunication signals at a first predetermined wavelength, said amplifier having a telecommunication signal input and a telecommunication signal output and comprising:
   an optical coupler having a telecommunication signal first input, a second input and an output;
   a first portion of optical fiber comprising an active optical fiber having a first core with a cladding therearound, said first active optical fiber being connected to said output of said optical coupler and said core being doped with a fluorescent dopant which emits energy in a wavelength range which includes said first predetermined wavelength and which has a maximum energy emission at a second wavelength different from said first predetermined wavelength;
   a source of pumping energy at a third wavelength different from, and lower than, said first predetermined wavelength and said second wavelength connected to said second input of said optical coupler for providing pumping energy to said first portion of optical fiber and raising the energy of the ions of said fluorescent dopant;
   a second portion of optical fiber having a first core and a second core within a cladding, said first core of said second portion of optical fiber being connected to said first core of said first portion so that optical signals at both said first predetermined wavelength and said second wavelength in said first core of said first portion are transmitted to said first core of said second portion, said first core and said second core of said second portion being optically coupled at said second wavelength to cause energy at said second wavelength to be transferred from said first core of said second portion to said second core of said second portion and said second core of said second portion being open-ended and having a length such that energy at said second wavelength transferred to said second core is absorbed at said second core whereby said energy at said second wavelength is prevented from returning to said first core of said second portion.

20. An active fiber optical amplifier as set forth in claim 19 wherein said optical coupler is a dichroic coupler.

21. An active fiber optical amplifier as set forth in claim 19 wherein said second core contains an absorbing dopant which absorbs energy at said second wavelength.

22. An active fiber optical amplifier as set forth in claim 21 wherein said dichroic coupler has said output and said first input and said second input, said first portion of optical fiber as an input, said output is coupled to said input of said first portion of optical fiber, and said first input is adapted for connection to said source of telecommunication signals.

23. An active fiber optical amplifier as set forth in claim 19 wherein said second core is without an absorbing dopant and the lengths of said first core of said second portion of optical fiber and said second core of said second portion of optical fiber are within 10% of a whole multiple of a beating length between said first core of said second portion and said second core of said second portion.

24. An active fiber optical amplifier as set forth in claim 19 wherein said first core of said second portion of said optical fiber comprises said fluorescent dopant.

25. An active fiber optical amplifier as set forth in claim 19 wherein said first core of said second portion of optical fiber is connected to said first core of said first portion of optical fiber by a single optical fiber.

26. An active fiber optical amplifier as set forth in claim 19 wherein said second core of said second portion of optical fiber contains an absorbing dopant which absorbs energy at said wavelength different from said predetermined wavelength.

27. An active fiber optical amplifier as set forth in claim 26 wherein the content of said absorbing dopant and the coupling of said first core of said second portion of optical fiber and said second core of said second portion of optical fiber are selected so that said second core of said second portion of optical fiber has a length less than one-tenth of the beating length between said first core of said second portion of optical fiber and said second core of said second portion of optical fiber at the coupling wavelength.

28. An active fiber optical amplifier as set forth in claim 26 wherein said absorbing dopant is the same as the first-mentioned said dopant.

29. An active fiber optical amplifier as set forth in claim 28 wherein both said absorbing dopant and said first-mentioned said dopant are erbium.

30. An active fiber optical amplifier as set forth in claim 26 wherein said absorbing dopant is selected from the group consisting of titanium, vanadium, chromium, iron and mixtures thereof, part of the selected absorbing dopant being present in its lower valency state.

31. An active fiber optical amplifier as set forth in claim 19 wherein the first-mentioned dopant is erbium.

32. An active fiber amplifier as set forth in claim 31 wherein said wavelength at which said second core of said second portion of optical fiber is coupled to said first core of said second portion of optical fiber is in the range from 1530 nm to 1540 mn.

33. An active fiber optical amplifier as set forth in claim 19 wherein the length of said first core and said length of said second fiber within said second portion of optical fiber are at least equal to the beat length between said first core and said second core of said second portion of optical fiber at the coupling wavelength.

34. An active fiber optical amplifier as set forth in claim 33 wherein said second core of said second portion of optical fiber is without an absorbing dopant and the lengths of said second core and said first core of said second portion of optical fiber are within 10% of a whole multiple of a beat length between said second core and said first core of said second portion of optical fiber.

35. An active fiber optical amplifier as set forth in claim 19 wherein said first core and said second core of said second portion of optical fiber are within a common cladding, the last-mentioned said first core is co-axial with the external surface of said cladding and the last-mentioned said second core is offset with respect to the axis of said cladding.

36. An active fiber optical amplifier as set forth in claim 19 wherein at least said first portion of optical fiber is monomodal at said predetermined wavelength and at the wavelength of said pumping energy.

37. An active fiber optical amplifier as set forth in claim 19 wherein there are a plurality of sections of said second portion of optical fiber in series, the first core of one said plurality of sections being connected to the first core of the next adjacent section by a length of the last-mentioned said first core without said second core, the last-mentioned said length being selected to provide a gain of not more than 15 dB at said wavelength of coupling between the said first core of said second portion of optical fiber and said second core of said second section of optical fiber.

38. An active fiber optical amplifier as set forth in claim 37 wherein one of said plurality sections is at at least one end of said series of sections.

39. An active fiber optical amplifier as set forth in claim 19 wherein said second portion of optical fiber is constrained in an arc to provide said coupling wavelength.

* * * * *

UNITED STATES PATENT AND TRADEMARK OFFICE
CERTIFICATE OF CORRECTION

PATENT NO. : 5,218,665
DATED : June 8, 1993
INVENTOR(S) : Grasso et al

It is certified that error appears in the above-indentified patent and that said Letters Patent is hereby corrected as shown below:

Col. 2, line 6, after "of" insert --transmission--;

Col. 7, line 29, after "No." insert --1,--.

Signed and Sealed this

Twenty-first Day of June, 1994

Attest:

BRUCE LEHMAN

*Attesting Officer*  *Commissioner of Patents and Trademarks*